United States Patent [19]
Ojanpera et al.

[11] Patent Number: 5,703,873
[45] Date of Patent: Dec. 30, 1997

[54] METHOD AND APPARATUS FOR SYNCHRONIZING SUBSCRIBER EQUIPMENT WITH BASE STATIONS IN A CDMA RADIO NETWORK

[75] Inventors: Tero Ojanpera; Ilkka Keskitalo, both of Oulu, Finland

[73] Assignees: Nokia Telecommunications Oy, Espoo, Finland; Nokia Mobile Phones Ltd., Salo, Finland

[21] Appl. No.: 453,242

[22] Filed: May 30, 1995

[30] Foreign Application Priority Data

May 30, 1994 [FI] Finland ................... 942524

[51] Int. Cl.⁶ .................. H04B 7/26; H04J 13/02
[52] U.S. Cl. .............. 370/332; 370/335; 370/491
[58] Field of Search ................ 370/18, 95.1, 95.3, 370/98, 110.4, 110.1, 320, 328, 331, 332, 333, 335, 342, 350, 491, 500, 503, 520, 527, 529; 375/200, 205; 455/31.1, 32.1, 33.1, 33.2, 54.1, 56.1

[56] References Cited

U.S. PATENT DOCUMENTS

| | | | |
|---|---|---|---|
| 4,792,984 | 12/1988 | Mtsuo | 455/32.1 |
| 4,989,204 | 1/1991 | Shimizu et al. | 455/33.2 |
| 5,103,459 | 4/1992 | Gilhousen et al. | 375/1 |
| 5,109,390 | 4/1992 | Gilhousen et al. | 375/1 |
| 5,212,804 | 5/1993 | Choate | 455/33.1 |
| 5,235,612 | 8/1993 | Stilwell et al. | 370/18 |
| 5,339,184 | 8/1994 | Tang | 455/33.1 |
| 5,365,544 | 11/1994 | Schilling | 375/205 |

FOREIGN PATENT DOCUMENTS

| | | | |
|---|---|---|---|
| 0565504 | 10/1993 | European Pat. Off. | H04J 13/00 |
| 0564937 | 10/1993 | European Pat. Off. | H04B 7/26 |
| 0607755 | 7/1994 | European Pat. Off. | H04B 7/26 |
| 0630120 | 12/1994 | European Pat. Off. | H04B 7/26 |
| 9310604 | 5/1993 | WIPO | H04B 14/02 |
| 9315573 | 8/1993 | WIPO | H04J 13/00 |

OTHER PUBLICATIONS

Telecommunications Industry Association, *TIA/EIA Interim Standard: Mobile Station–Base Station Compatibility Standard for Dual–Mode Wideband Spread Spectrum Cellular System*, Jul. 1993, TAI/EIA/IS-95, pp. 7-1 to 7-24.

*Primary Examiner*—Hassan Kizou
*Attorney, Agent, or Firm*—Cushman Darby & Cushman Intellectual Property Group of Pillsbury Madison & Sutro LLP

[57] ABSTRACT

A base station, a subscriber equipment, and a method for synchronizing the subscriber equipment with the transmission of the base station in a digital cellular radio network utilizing the CDMA multiple access method. In each cell of the network, at least one base station communicates with the subscriber equipment within its area, in which network the base station transmits a separate pilot channel provided with a predetermined spreading code. In order to facilitate the synchronization of the subscriber equipment, the base station transmits a data-modulated signal on the pilot channel.

11 Claims, 3 Drawing Sheets

METHOD AND APPARATUS FOR SYNCHRONIZING SUBSCRIBER EQUIPMENT WITH BASE STATIONS IN A CDMA RADIO NETWORK

Method for synchronizing subscriber equipments, a base station and a subscriber equipment

BACKGROUND OF THE INVENTION

The invention relates to a method for synchronizing subscriber equipment with the transmission of a base station in a digital cellular radio network utilizing the CDMA multiple access method, and comprising in each cell at least one base station communicating with subscriber equipment within its area, and in which network the base station transmits a separate pilot channel provided with a predetermined spreading code.

Code Division Multiple Access (CDMA) is a multiple access method, which is based on the spread spectrum technique and which has been applied recently in cellular radio systems, in addition to the earlier-developed FDMA (Frequency Division Multiple Access) and TDMA (Time Division Multiple Access) methods. CDMA has several advantages over those earlier developed methods, for example spectral efficiency, the simplicity of frequency planning, and traffic capacity.

In the CDMA method, the narrow-band data signal of the user is multiplied to a relatively wide band of a traffic channel by a spreading code having a considerably broader band than the data signal. In known cellular network test systems, bandwidths such as 1.25 MHz, 10 MHz and 25 MHz have been used. In connection with multiplying, the data signal spreads to the entire band to be used. All users transmit by using the same frequency band, i.e. traffic channel, simultaneously. A separate spreading code is used over each connection between a base station and a subscriber equipment, and the signals of the users can be distinguished from one another in the receivers on the basis of the spreading code of each connection.

Correlators provided in conventional CDMA receivers are synchronized with a desired signal, which they recognize on the basis of a spreading code in the signal. The data signal is restored in the receiver to the original band by multiplying it again by the same spreading code as at the transmission stage. Signals multiplied by some other spreading code at the transmission stage do not correlate in an ideal case with the spreading code used in the receiver and are not restored to the narrow band. They appear thus as noise with respect to the desired signal. The spreading codes of the system are preferably selected in such a way that the codes used in each system cell are mutually orthogonal, i.e. they do not correlate with each other.

In a typical mobile phone environment, the signals between a base station and a mobile station propagate along several paths between the transmitter and the receiver. This multipath propagation is mainly due to the reflections of the signal from the surrounding surfaces. Signals which have propagated along different paths arrive at the receiver at different times due to their different transmission delays. CDMA differs from the conventional FDMA and TDMA in that the multipath propagation can be exploited in the reception of the signal. The receiver generally utilized in a CDMA system is a so-called rake receiver, which consists of one or more rake branches. Each branch is an independent receiver unit, the function of which is to compose and demodulate one received signal component. Each rake branch can be caused to synchronize with a signal component which has propagated along an individual path, and, in a conventional CDMA receiver, the signals of the receiver branches are preferably combined, whereupon a signal of good quality is achieved.

The signal components received by the branches of a CDMA receiver may be transmitted from one, or several base stations. The latter case is called macro diversity, which is a form of diversity by means of which the quality of a connection between a mobile station and a base station can be improved. In CDMA cellular radio networks, the macro diversity, which is also called "soft handover", is used to ensure the efficiency of power control near the borders of base stations, and to enable smooth handover. In macro diversity, a mobile station thus communicates simultaneously with two or more base stations. The same information is transmitted over each connection.

In a CDMA cellular radio system, it is possible to use a so-called pilot channel in the transmission direction of base to subscriber equipment, i.e. in the downlink direction. A pilot channel is a signal which is transmitted with a specific spreading code and utilizing the same frequency band on which the actual traffic channels are situated, the pilot signal being distinguishable from them only on the basis of the spreading code. The pilot signal is a channel known and listened to by all subscriber equipments within the cell area, and it is used for example in power measurements and in the generation of a coherent phase reference. Each base station of the system transmits its own pilot signal on the basis of which the subscriber equipment can distinguish the transmissions of different base stations from each other. In CDMA, all base stations may transmit using the same frequency band.

U.S. Pat. No. 5,109,390 and EIA/TIA Interim Standard: Mobile Station—Base Station Compatibility Standard for Dual-Mode Wideband Spread Spectrum-Cellular System, TIA/EIA/IS-95, July 1993, which are referred to here, disclose a prior art CDMA cellular radio system employing a separate pilot channel which is transmitted by utilizing a predetermined spreading code. The signal of the pilot channel is data-unmodulated, i.e. it contains no data information.

FIG. 1 shows a prior art arrangement for generating a pilot signal in a base station, where a signal 10 comprising only zero symbols (000 . . . ) is multiplied in a multiplier 12 with the spreading code 11 of the pilot signal. The obtained signal is multiplied with a carrier frequency OSC1 in a multiplier 13, filtered with a transmission filter 14, and transmitted by means of an antenna 15. The pilot signal thereby contains no data information, but only the spreading code.

As described above, a subscriber equipment must synchronize itself with a signal it has received from a base station. There are two kinds of situations where synchronization is needed: during call set-up and during handover. In CDMA, it is also possible to distinguish synchronization of two different levels: code and frame synchronization. In the prior art arrangements, the signal of the pilot channel is used to achieve code synchronization, whereas frame synchronization is provided by means of separate control channels. Known arrangements have required the use of two separate control channels for this purpose.

When soft handover is to be made between two base stations, i.e. when a connection is to be maintained simultaneously with more than one base station, the terminal equipment should be synchronized with both base stations. If the system is synchronous, i.e. the base stations have a common clock signal, e.g. a GPS signal, the synchronization with different base stations does not usually constitute a problem. Instead, if the cellular radio system is asynchronous, i.e. the base stations are not synchronized with each other but each of them has its own clock, the synchronization in conventional systems has been a difficult and slow operation.

In CDMA, the synchronization should take place quickly and reliably, so that both the establishment of a connection between a base station and a terminal equipment and the handover between base stations will be fast. The present systems thus require one or several control channels to make synchronization possible. These channels consume the capacity of the actual traffic channel, and during handover, the synchronization with the transmission of a neighbouring base station in an asynchronous system is difficult.

SUMMARY OF THE INVENTION

The purpose of the present invention is to realize a method with which subscriber equipment can be synchronized with the transmissions of both their own base station and neighbouring base stations quickly and reliably.

This is achieved with a method in which the base station transmits a data-modulated signal on the pilot channel.

The invention also relates to a base station to be used in a CDMA cellular radio network comprising, in each cell, at least one base station communicating with subscriber equipment within its area and comprising means for transmitting a separate pilot channel provided with a predetermined spreading code. The base station according to the invention is characterized in that the base station comprises means for transmitting a data-modulated signal on the pilot channel.

The invention further relates to a subscriber equipment to be used in a CDMA, cellular radio network. comprising in, each cell, at least one base station communicating with subscriber equipment within its area, in which network the base station transmits a separate pilot channel provided with a predetermined spreading code. The subscriber equipment according to the invention is characterized in that the subscriber equipment comprises means for synchronizing with the transmission of the base station by means of a signal contained in the pilot channel.

The method according to the invention, wherein data-modulated information is included in the pilot signal, provides several advantages over the prior methods. In a preferred embodiment of the invention, data modulation is realized in such a way that one or several symbols of the spreading code sequence transmitted on the pilot channel are inverted. The receiver may thus be synchronized with the transmission of the base station without a separate synchronization channel being needed in the system, whereupon the bandwidth required by the channel can thereby be used for the needs of the traffic channel. In handover situations in particular, it is advantageous that the terminal equipment need no other channels but the pilot channel from the neighbouring base station in order to achieve frame synchronization.

BRIEF DESCRIPTION OF THE INVENTION

In the following, the invention will be described in greater detail with reference to the examples according to the accompanying drawings, in which.

DETAILED DESCRIPTION

In an asynchronous cellular radio system where the method according to the invention is preferably applied, the internal clocks of different base stations are not synchronized with each other. The time difference of the clocks of even adjacent base stations may thereby be several dozens of milliseconds. For this reason, a subscriber equipment which is synchronised with the base station of its own area must be resynchronized both on the level of codes and frames if it is to receive the transmission of another base station.

In a synchronous cellular radio network, in turn, there may occur situations where the symbol rate of a signal is high compared to the signal propagation delay on the radio path between the base station and the terminal equipment. The difference may be several symbol periods. The method according to the invention may thus be advantageously applied also in a synchronous system, in order to provide more accurate frame synchronization in the receiver. During handover, the subscriber equipment does not then have to know when the frame of the neighbouring base station begins.

There are two kinds of situations where synchronization is needed, as described above: during call set-up and during handover. In the following, the use of the method according to the invention is described, in both cases beginning from the call set-up.

In a preferred embodiment of the method according to the invention, it is possible to realize the data modulation on the pilot channel by inverting one or several symbols in the signal to be transmitted. These inverted symbols can be detected in the receiver and utilized in the synchronization process. Short spreading codes are often used on the pilot channel so that the code synchronization would be rapid. When the method according to the invention is applied, an inverted symbol is then used in the code sequence during one or several symbols, for example during the first symbols of each frame.

Figure 1:
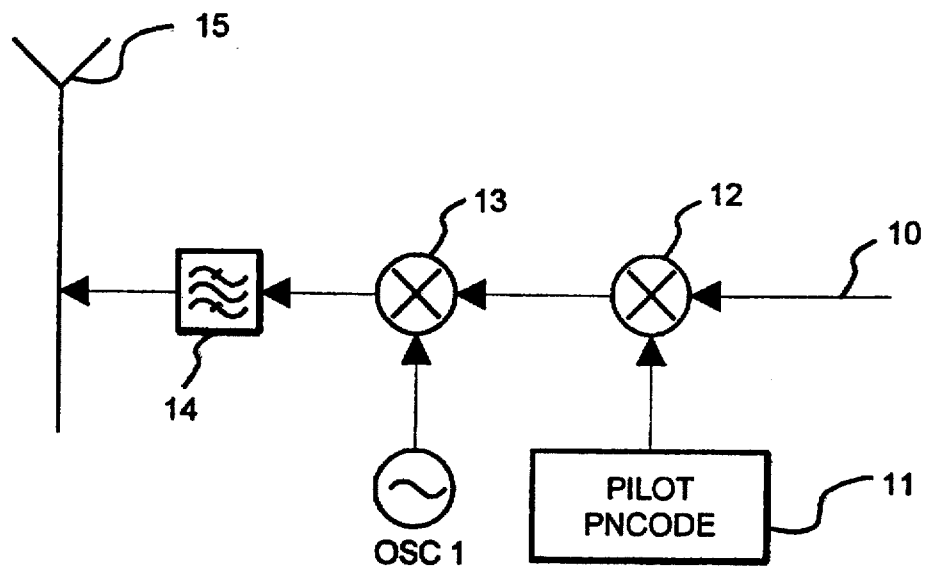
FIG. 1 shows a prior art arrangement for generating a pilot signal.
Figure 2:
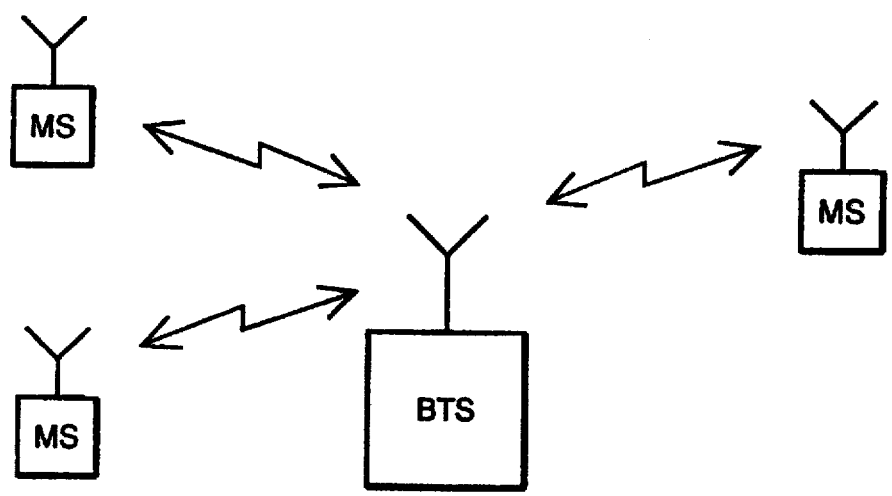
FIG. 2 shows a system in which the method according to the invention can be applied.

Compared with FIG. 1, where the data signal 10 in the prior art solution is only a zero signal, the signal in the method according to the invention contains some data information, i.e. it may thus have values other than zero.

When the subscriber equipment is switched on, it scans the frequency band used to find the pilot transmission of the base stations. The scanning is performed, for example, in steps of half a chip. A chip refers to the length of the bit of the spreading code, and it is thus considerably shorter in time than the length of the user's data bit. Since the clocks of the base stations are not synchronized, the spreading codes they use on the pilot channel must be different codes. In a synchronous system, it is possible to use different phases of the same code on the pilot channel. When the terminal equipment scans the frequency band, it can select the codes it is looking for either in a random order, or it can begin from the spreading code used on the pilot channel when the equipment was switched off. In the receiver, the phase of the reference spreading code is changed in steps of, for example, half a chip, and the calculation of correlation through the code is performed on each phase. If a peak is visible at the output of the correlator, the pilot signal has been found. When the terminal equipment finds the pilot channel, it reads the code index, code phase and the strength of the received signal. If the strength is greater than a predetermined threshold, the values are stored in a memory. The discovered pilot transmissions are compared with each other, and the base station received with the highest power is selected.

In searching for the pilot channel, squared or absolutized values of the output of the searcher correlator are used, and the effect of the data modulation is thereby eliminated. The search may thus be realized by utilizing known methods. In a preferred embodiment of the method according to the invention, the polarity of the correlator's output changes when inverted symbols are received. The transmitted data modulation can thereby be easily detected in the receiver, and this information can be used in frame synchronization.

The subscriber equipment can now transmit a call set-up message to the selected base station. The call set-up message is most often transmitted as a random access message on the random access channel (RACH) which is a channel shared by the terminal equipment of the base station. The base station detects the message and transmits acknowledgement to the terminal equipment, and the call set-up is continued in previously known ways.

In the case of soft handover, the subscriber equipment scans the frequency band looking for the pilot channels of the neighbouring base stations. The base station with which the terminal equipment communicates has transmitted to the terminal equipment the spreading codes used by the base stations of the neighbouring cells on the pilot channels. The scanning is performed during the call set-up as described above. The terminal equipment measures the signal strength of the pilot channels it has found, and, if the strength of one or several pilots exceeds a given threshold, the terminal equipment sends this information to the base station, which possibly starts a soft handover process. The terminal equipment can also activate soft handover.

The method according to the invention is especially advantageous in a case of soft handover, since when the terminal equipment has found the pilot signal of the neighbouring channel, code-synchronized itself with it, and measured its strength, the equipment can be immediately frame-synchronized with it without having to look for the separate control channels transmitted by the base station for the synchronization. This reduces the operations required in the terminal equipment during soft handover, which can thereby be performed more rapidly and reliably than previously.

Figure 3:
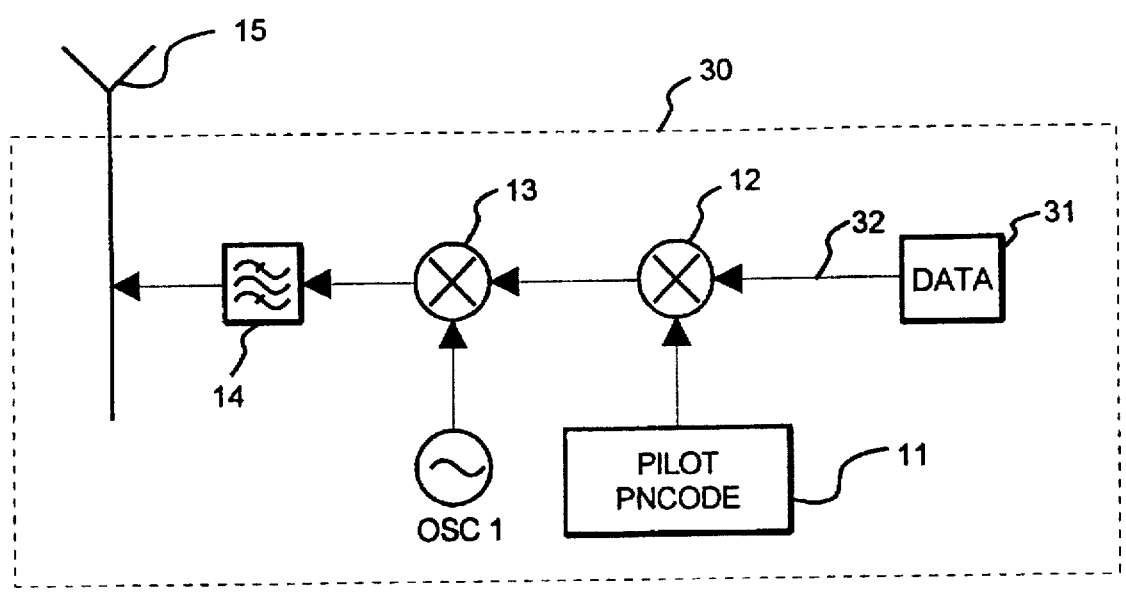
FIG. 3 is a block diagram illustrating the structure of a base station according to the invention.

FIG. 3 shows a block diagram illustrating the structure of a base station according to the invention. At the base station according to the invention, means 30 for transmitting a pilot channel provided with a predetermined spreading code comprise means 31 for generating a signal 32 containing data information, the signal being multiplied in a multiplier 12 with the spreading code 11 of the pilot channel. This broad-band signal containing data information is transferred to a carrier frequency by multiplying it in a multiplier 13 with a carrier wave obtained from an oscillator OSC 1, and the obtained signal is provided through a filter 14 to an antenna 15.

In a preferred embodiment of the invention, the base station comprises means 11, 12 and 31 with which the data modulation is realized in such a way that one or several symbols at the beginning of each frame of the signal to be transmitted are inverted.

The base station to be realized, of course also comprises other components, such as filters and amplifier units, but for the sake of clarity they have been omitted from the accompanying description and figure as components not central to the basic idea of the invention.

Figure 4:
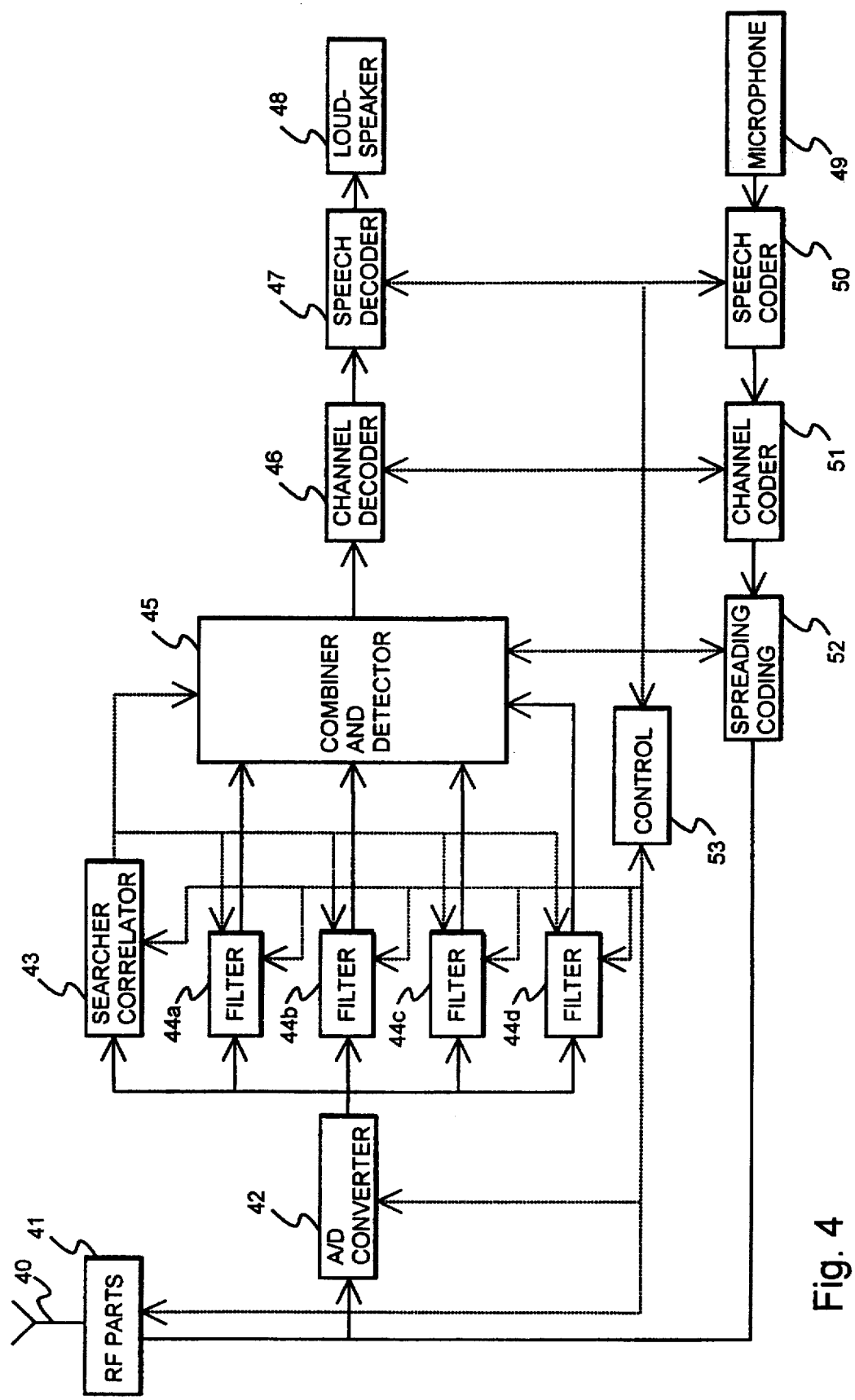
FIG. 4 is a block diagram illustrating the structure of a subscriber equipment according to the invention.

FIG. 4 shows a block diagram illustrating the structure of a subscriber equipment of the CDMA cellular radio network according to the invention. In the direction of reception, the subscriber equipment comprises an antenna 40 receiving a signal which is provided through radio-frequency parts 41 to an A/D converter 42. The converted signal is provided to matched filters 44a to 44d, each of which is synchronized with a signal component propagated along an individual path. Furthermore, the converted signal is provided to a searcher correlator 43, the function of which is to search for signal components transmitted with the desired spreading code. From the matched filters, the signal is applied to means 45 which preferably combine the received signal components and detect the signal. From the combiner, the signal is provided to a channel decoder 46, and from there via a speech decoder 47 to a loudspeaker 48. The terminal equipment according to the invention further comprises means 43, 45 for synchronizing the subscriber equipment with the transmission of the base station by means of the signal contained in the pilot channel. In the terminal equipment according to the invention, the means 43 correlate with the pilot signal transmitted from the base station, and by utilizing the means 45 the terminal equipment is frame-synchronized with the transmission of the base station by means of the pilot signal.

In the direction of transmission, the subscriber terminal comprises a microphone 49 providing a signal which is applied via a speech coder 50 and a channel coder 51 for the spreading coding 52. The terminal equipment also comprises radio-frequency means 41 through which the signal to be transmitted is provided to an antenna. The terminal equipment further comprises means 53, which control the operation of the aforementioned components.

The subscriber terminal, of course, comprises also other components, such as filters, but for the sake of clarity they have been left out of the accompanying description and figure as components not central to the basic idea of the invention.

Even though the invention is described above with reference to the example according to the accompanying drawings, it is clear that the invention is not restricted thereto, but it can be modified in many ways within the inventive idea defined in the appended claims.

We claim:

1. A method for synchronizing each of a plurality of units of subscriber equipment with transmission of particular ones of a plurality of base stations, in a digital cellular radio network utilizing CDMA, and having, in each cell of a plurality of cells of said network, at least one base station, each such base station having a respective coverage area and arranged to communicate with subscriber equipment within the respective said coverage area, each said base station being arranged for transmitting traffic for reception by subscriber equipment located within its respective said coverage area using a given frequency band and, for each subscriber equipment, a respective first spreading code which is unique to each respective subscriber equipment, (a) each said base station transmitting a respective data-modulated pilot signal for reception by all subscriber equipment located within its respective said coverage area, using said given frequency band and a respective second spreading code which is different from each said first spreading code; and (b) each subscriber equipment automatically exploiting at least one said pilot signal for at least one of:
  (i) determining which one of said base stations to become presently served by, as a presently serving base station, on the basis of relative signal strength and selecting that base station; and
  (ii) achieving code and frame synchronization with the presently serving base station selected in step (b) (i);

step (a) including data-modulating each said pilot signal to provide a respective data-modulated pilot signal, by inverting at least one symbol in at least one characteristic location in at least certain instances of transmitting of each said data-modulated pilot signal using the respective said second spreading code.

2. The method of claim 1, wherein:

at least one said subscriber equipment performs step (b) in connection with a handoff in which the respective said subscriber equipment undergoes a transition from being served by a first of said base stations, to being served by a second of said base stations.

3. The method of claim 2, wherein:

said handoff is a soft handoff.

4. The method of claim 1, wherein:

said subscriber equipment perform step (b) in connection with set-up of respective calls.

5. The method of claim 1 wherein:

said certain instances of transmitting of each said data-modulated pilot signal are frames, and said characteristic location occurs at the beginning of each frame.

6. The method of claim 1, wherein:

said certain instances of transmitting of each said data-modulated pilot signal using the respective said second spreading code are short relative to transmissions of traffic using each respective said first spreading code.

7. The method of claim 1, wherein:

each said base station performs said transmitting of step (a) synchronously in relation to others of said base stations.

8. The method of claim 1, wherein:

each said base station performs said transmitting of step (a) asynchronously in relation to others of said base stations.

9. A method for synchronizing each of a plurality of units of subscriber equipment with transmissions of particular ones of a plurality of base stations, in a digital cellular radio network utilizing CDMA and having, in each cell of a plurality of cells of said network, at least one base station, each such base station having a respective coverage area and arranged to communicate with subscriber equipment within the respective said coverage area, each said base station being arranged for transmitting traffic for reception by subscriber equipment located within its respective said coverage area using a given frequency band and, for each subscriber equipment, a respective first spreading code which is unique to each respective subscriber equipment, said method comprising:

each said base station transmitting a respective data-modulated pilot signal for reception by all subscriber equipment located within its respective said coverage area, using said given frequency band and a respective second spreading code which is different from each said first spreading code, including data-modulating said pilot signal by inverting at least one symbol in at least one characteristic location in at least certain instances of transmitting of each said data-modulated pilot signal using the respective said second spreading code; and each subscriber equipment automatically exploiting at least one said pilot signal for:

(a) determining which one of said base stations to become presently served by, as a presently serving base station, on the basis of relative signal strength; and (b) achieving code and frame synchronization with the presently serving base station selected in step (a).

10. A base station for communicating with each of a plurality of units of subscriber equipment within a respective coverage area of a digital cellular radio network utilizing CDMA, and having a plurality of base stations each having a respective coverage area, comprising:

a transmitter including means for transmitting traffic for reception by subscriber equipment located within the respective said coverage area of said base station using a given frequency band and, for each subscriber equipment, a respective first spreading code which is unique to each respective subscriber equipment; and said transmitter also including means for transmitting a data-modulated pilot signal for reception by all subscriber equipment located within the respective said coverage area of said base station, using said given frequency band and a second spreading code which is different from each said first spreading code, for enabling each subscriber equipment to automatically exploit said data-modulated pilot signal for at least one of:

(i) determining which one of said plurality of base stations, including said base station, to become presently served by, as a presently serving base station, on the basis of relative signal strength and selecting that base station; and (ii) achieving code and frame synchronization with the presently serving base station selected in (i);

said transmitter including means for data-modulating said pilot signal by inverting at least one symbol in at least one characteristic location in at least certain instances of transmitting of said data-modulated pilot signal using said second spreading code.

11. A subscriber equipment for use in plurality in digital cellular radio network utilizing CDMA, and having, in each of a plurality of cells of the network, at least one base station having a coverage area and arranged to communicate with said subscriber equipment when said subscriber equipment is located within the respective said coverage area, and in which system each said base station is arranged for transmitting traffic for reception by a subscriber equipment located within its respective said coverage area using a given frequency band and, for each subscriber equipment, a respective first spreading code which is unique to each respective subscriber equipment, and for transmitting a data-modulated pilot signal for all subscriber equipment located within its respective said coverage area, using said given frequency band and a second spreading code which is different from each said first spreading code, said subscriber equipment comprising:

means for automatically exploiting data received on at least one said data-modulated pilot signal for at least one of:

(i) determining which of said base stations to become presently served by, as presently serving base station, on the basis of relative signal strength and selecting that base station; and (ii) achieving code and frame synchronization with the presently serving base station selected in (i); and means for receiving traffic transmitted by the resentl servin base station using the respective said first spreading code;

said means for automatically exploiting data received on at least one pilot signal including means for automatically exploiting said data when generated by said data-modulated pilot signal has become data-modulated by inverting at least one symbol in at least one characteristic location in at least certain instances of transmitting of said data-modulated signal by the base station selected in step (i) using said second spreading code.

* * * * *